United States Patent [19]

Hayes

[11] Patent Number: 5,727,188
[45] Date of Patent: Mar. 10, 1998

[54] FLIGHT-CONTROL SIMULATOR FOR COMPUTER GAMES

[76] Inventor: Charles L. Hayes, 4421 Highland Ave., Carlsbad, Calif. 92008

[21] Appl. No.: 589,020

[22] Filed: Jan. 19, 1996

Related U.S. Application Data

[63] Continuation of Ser. No. 59,893, May 10, 1993, abandoned.

[51] Int. Cl.⁶ .................................................. G09B 9/08
[52] U.S. Cl. .................................................. 395/500; 434/45
[58] Field of Search ..................... 395/500; 364/578, 364/474.22; 434/45; 446/144; 273/85 R, 313; D19/63; D21/48

[56] References Cited

U.S. PATENT DOCUMENTS

| | | | |
|---|---|---|---|
| D. 297,028 | 8/1988 | McCann | D21/48 |
| D. 322,094 | 12/1991 | Holloway | D19/63 |
| D. 328,315 | 7/1992 | Shulman | D21/48 |
| 4,006,899 | 2/1977 | Lohr et al. | 273/85 R |
| 4,236,343 | 12/1980 | Wildman | 46/39 |
| 4,475,843 | 10/1984 | Wyler | 403/394 |
| 4,599,070 | 7/1986 | Hladky et al. | 434/45 |
| 4,605,303 | 8/1986 | Haines | 356/73 |
| 4,887,966 | 12/1989 | Gellerman | 434/45 |
| 5,006,193 | 4/1991 | Quick | 156/350 |
| 5,040,407 | 8/1991 | Hinckley et al. | 73/2 |
| 5,150,899 | 9/1992 | Kitaue | 273/85 |
| 5,240,051 | 8/1993 | Quick et al. | 144/352 |
| 5,245,320 | 9/1993 | Bouton | 345/167 |
| 5,247,468 | 9/1993 | Henrichs et al. | 364/578 |
| 5,248,150 | 9/1993 | Koma | 273/313 |
| 5,288,078 | 2/1994 | Capper et al. | 273/148 B |

*Primary Examiner*—Krisna Lim
*Attorney, Agent, or Firm*—Thomas J. Tighe

[57] ABSTRACT

A control wheel attached to a control wheel column is movably mounted to a control housing that is securely fastened to a support surface by way of a pair of pivoting clamp mechanisms. In-and-out movement of the control wheel column with respect to the control housing manipulates the elevator control mounted in the housing. Turning of the control wheel with respect to the control wheel column manipulates the aileron control mounted in the control housing. Additional button control and variable controls are mounted on the control wheel and control housing. Besides an aileron trim tab, the control wheel contains several buttons that may be used as weapons triggers. Besides an elevator trim tab, the control housing contains a throttle control.

20 Claims, 9 Drawing Sheets

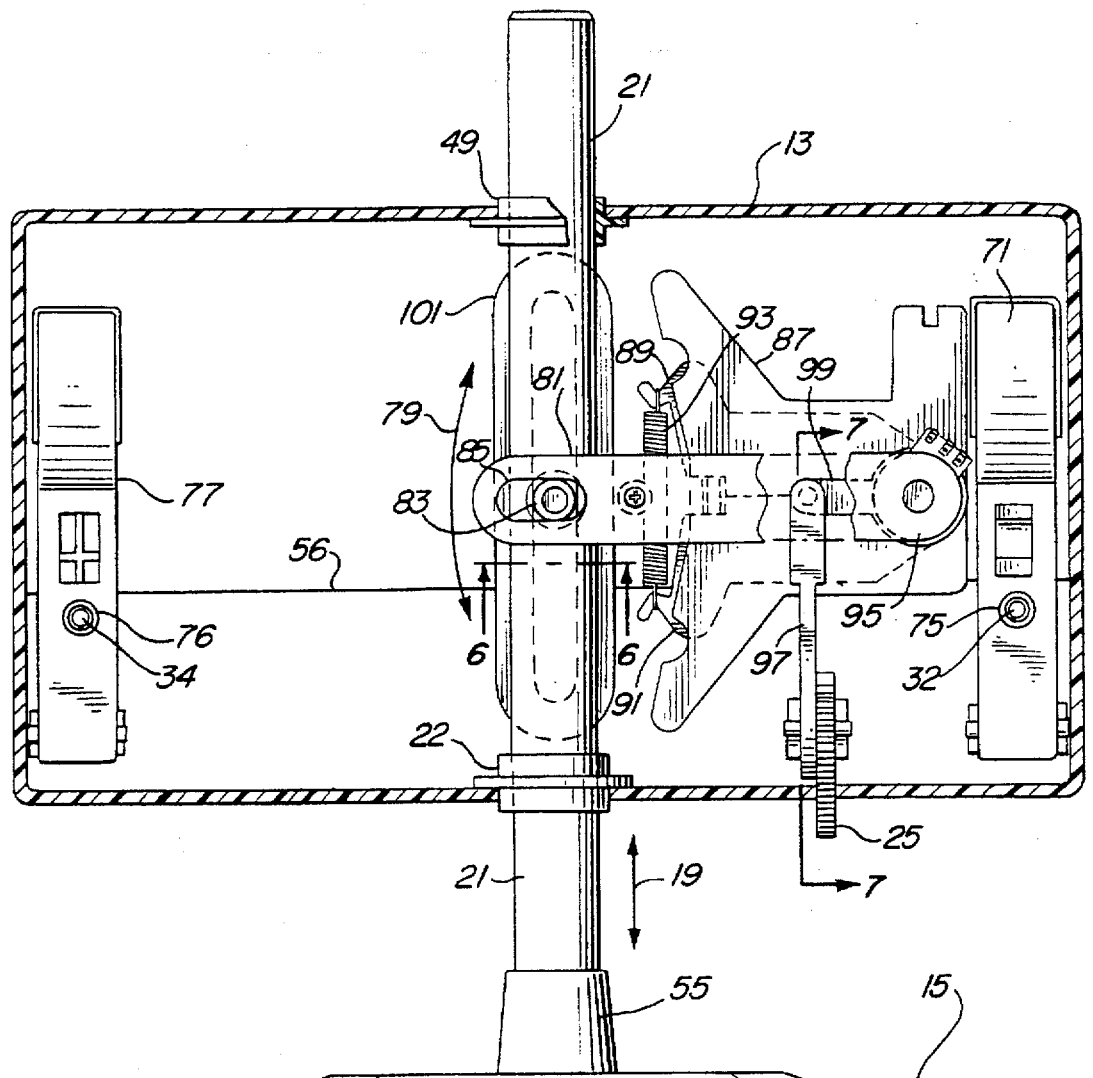
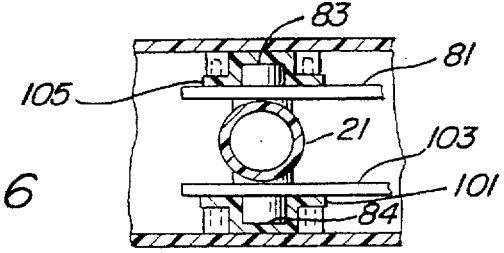

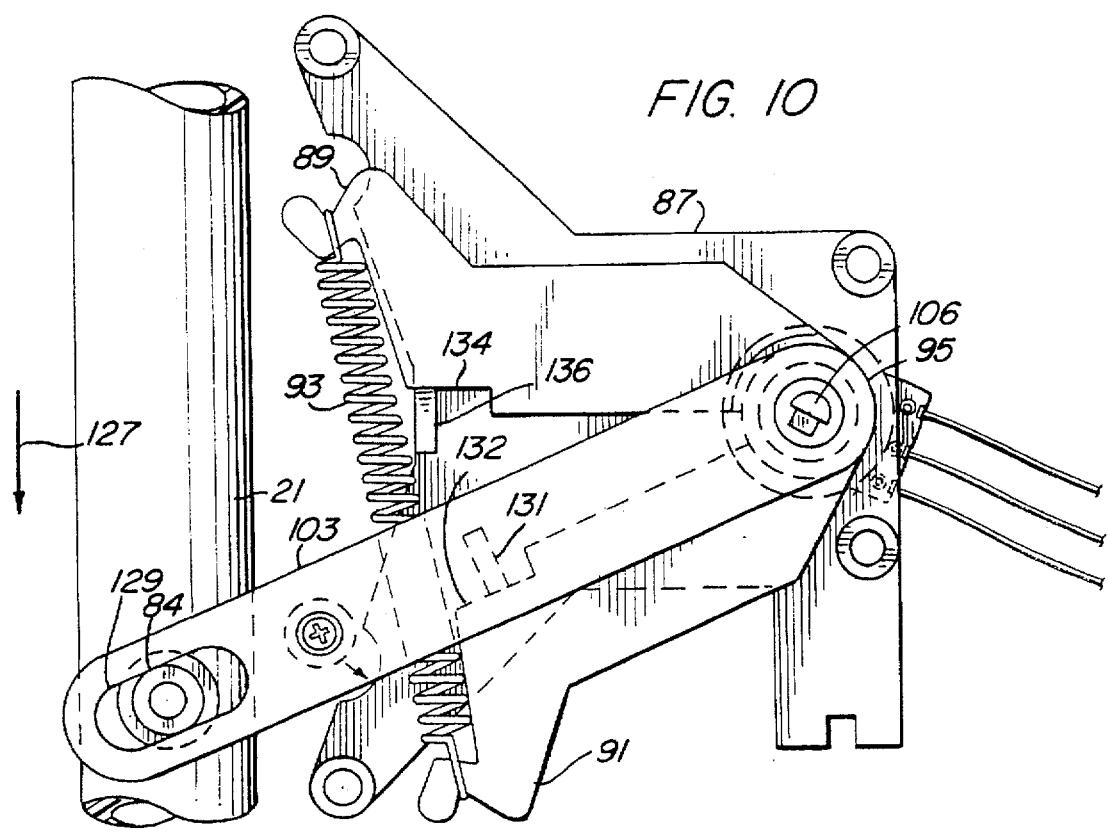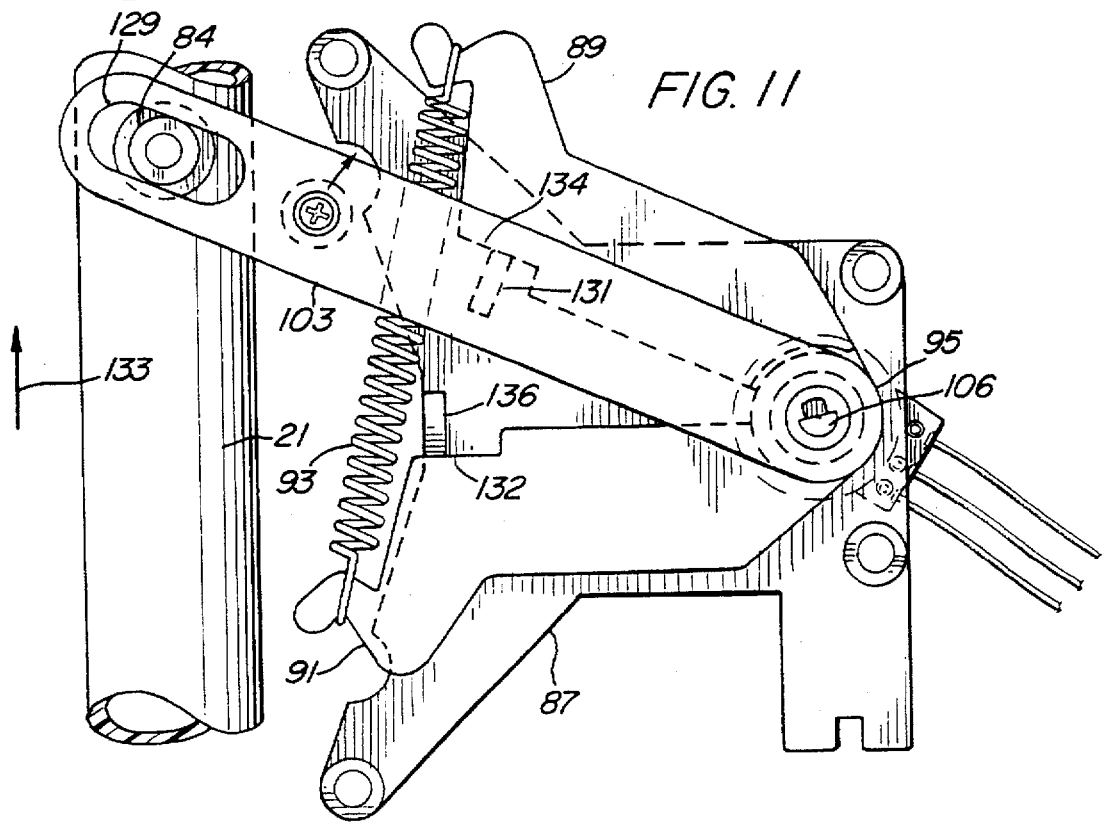

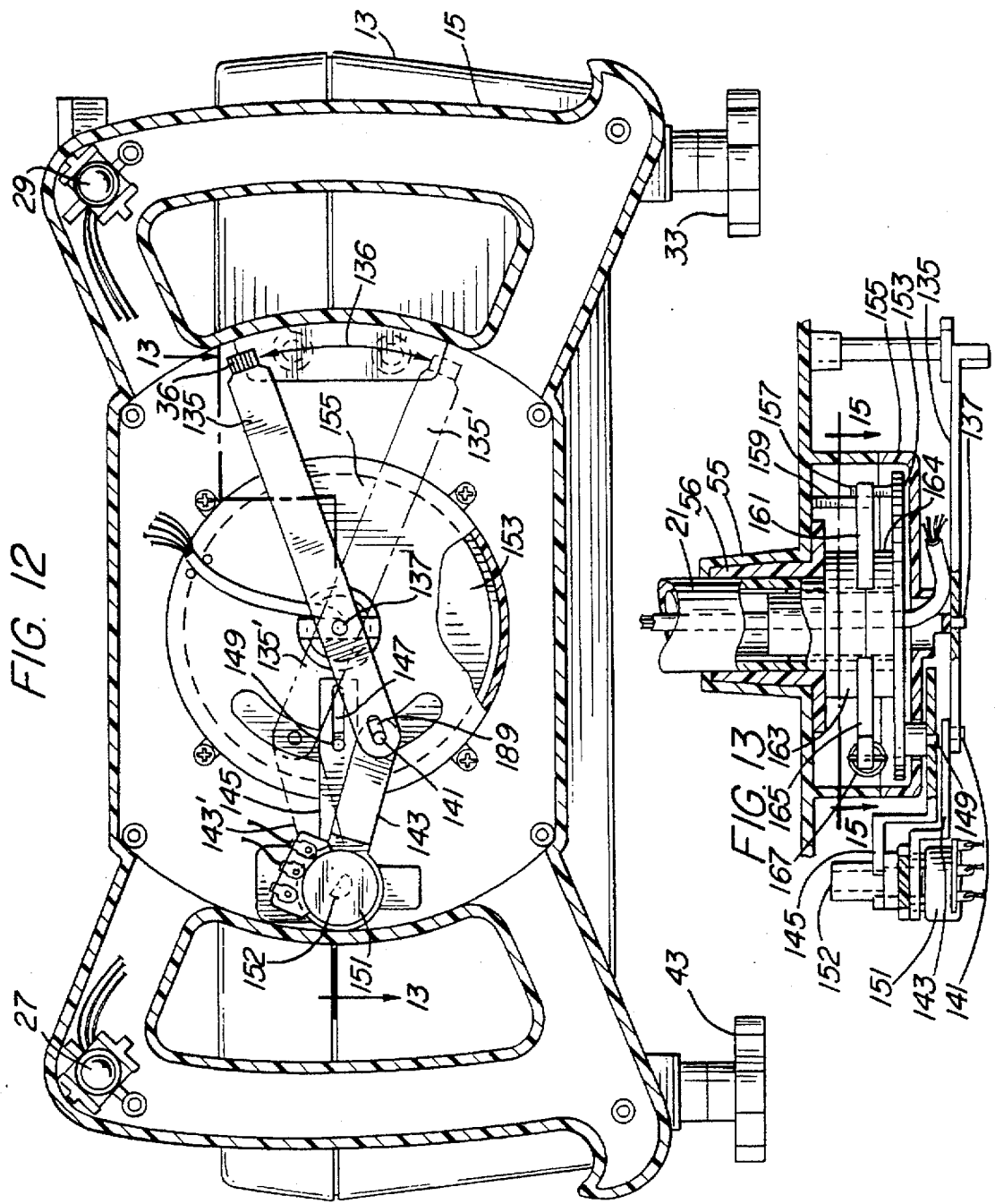

FLIGHT-CONTROL SIMULATOR FOR COMPUTER GAMES

This is a continuation of application Ser. No. 08/059,893, filed May 10, 1993 now abandoned.

BACKGROUND OF THE INVENTION

1. Field of the Invention

The present invention relates generally to improvements in user interface control devices for personal computers and, more particularly, pertains to new and improved yoke construction wherein complete aileron, elevator, and throttle control, among other controls, are provided to the user.

2. Description of Related Art

In the field of user interface devices for game applications, it has been a practice to employ joystick devices for the user to manipulate as the input device for a flight control computer game or driving game. Such devices have fallen short in providing the user with adequate control and a feeling of reality. To provide the user with a more realistic feeling of controlling an aircraft, some prior art devices have configured a joystick to appear more like a control stick in an airplane. Other devices have adapted and used a steering wheel-type configuration for aircraft and automobile games. All such devices have been unsatisfactory in that they still do not provide for a real sense of control and maneuverability to the user of such interface devices for flight control computer games or automobile driving games.

The present invention provides the user with a more realistic feel of movement of the interface device and more accurate control of the computer game.

SUMMARY OF THE INVENTION

A control housing containing electrical components is securely fastened to a support surface by a pair of pivoting clamp mechanisms. A control wheel containing electrical components is rotatably attached to a control wheel column. Rotation of the control wheel, left or right, with respect to the control wheel column, actuates an aileron control electrical component mounted inside the control wheel. The control wheel column is movably attached to the control housing. Moving the control wheel column into and out of the control housing actuates an elevator control electrical component mounted in said control housing.

BRIEF DESCRIPTION OF THE DRAWINGS

The exact nature of this invention, as well as its objects and advantages, will become readily apparent upon reference to the following detailed description when considered in conjunction with the accompanying drawings, in which like reference numerals designate like parts throughout the figures thereof, and wherein:

FIG. 5 is a top view cross-section of the control housing of the present invention;

FIG. 6 is a cross-section taken along lines 6—6 of FIG. 5;

FIG. 10 is a bottom view in partial showing one of the elements of FIG. 5;

FIG. 11 is a bottom view in partial showing the same elements shown in FIG. 10, in a different position;

FIG. 12 is a front view of the control wheel with its top cover removed;

FIG. 13 is a cross-section taken along line 13—13 in FIG. 12;

DESCRIPTION OF THE PREFERRED EMBODIMENTS

Figure 1:
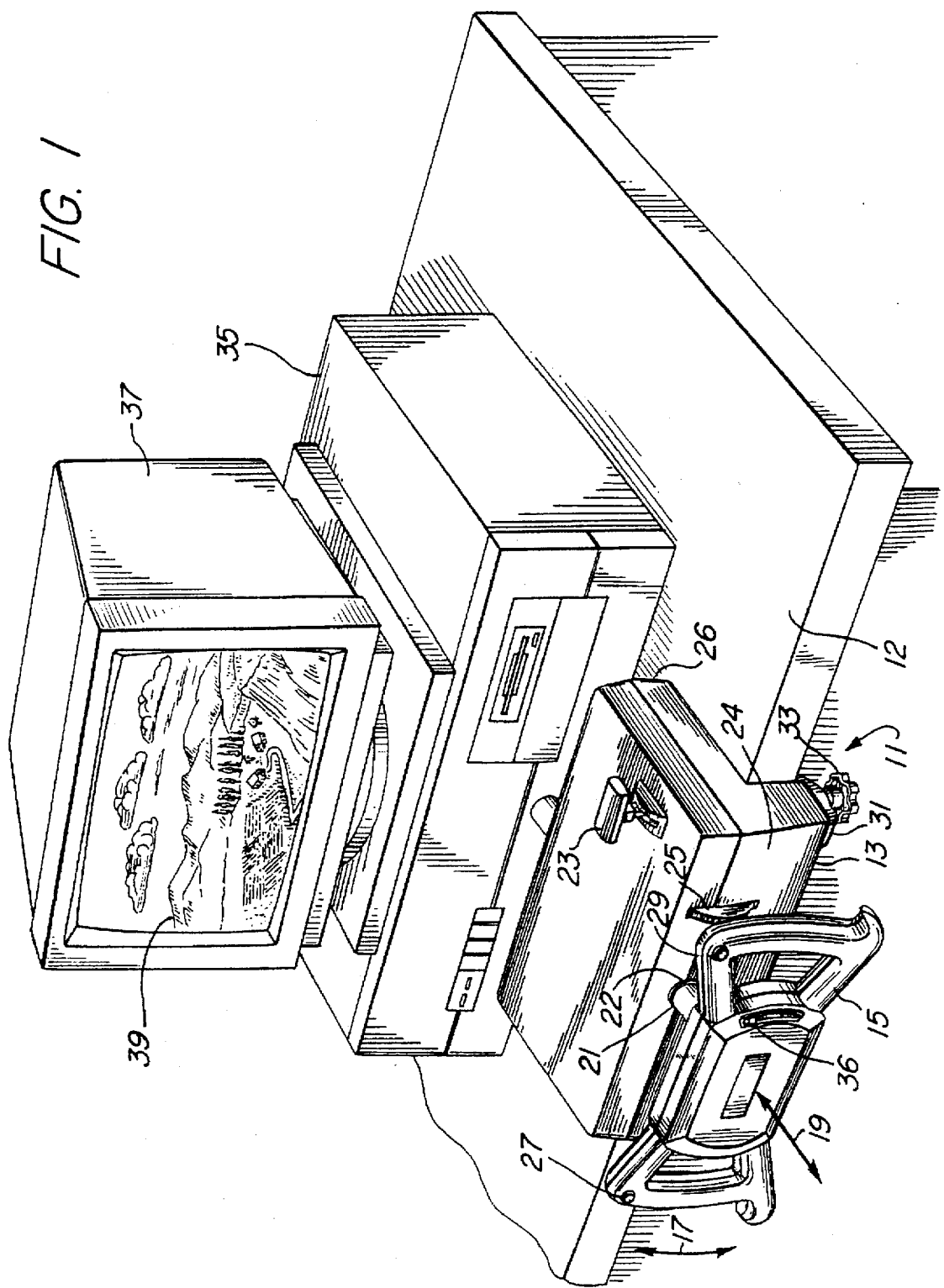
FIG. 1 is a perspective illustration of the present invention used in connection with a personal computer.

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a yoke control simulator for computer games that has the capability of complete aileron and elevator control, a throttle control, and various pushbuttons, as shown in FIG. 1.

The control simulator 11, which can be used for flight control games and automobile driving games according to the present invention, comprises a control housing 13 which is firmly clamped to table 12 by way of a desk clamp mechanism 31 which is tightened by a desk clamp knob 33. A control wheel shaft 21 is mounted within bearings 22 to move laterally in direction 19 with respect to control housing 13.

A control wheel 15 is movably mounted to the control wheel shaft 21 so as to rotate about the symmetrical axis of shaft 21 in direction 17. Thus, rotation of control wheel 15 to the left or right in direction 17 will be with respect to a nonrotating shaft 21, shaft 21 being allowed to move only in a direction 19 in and out of control housing 13.

Figure 2:
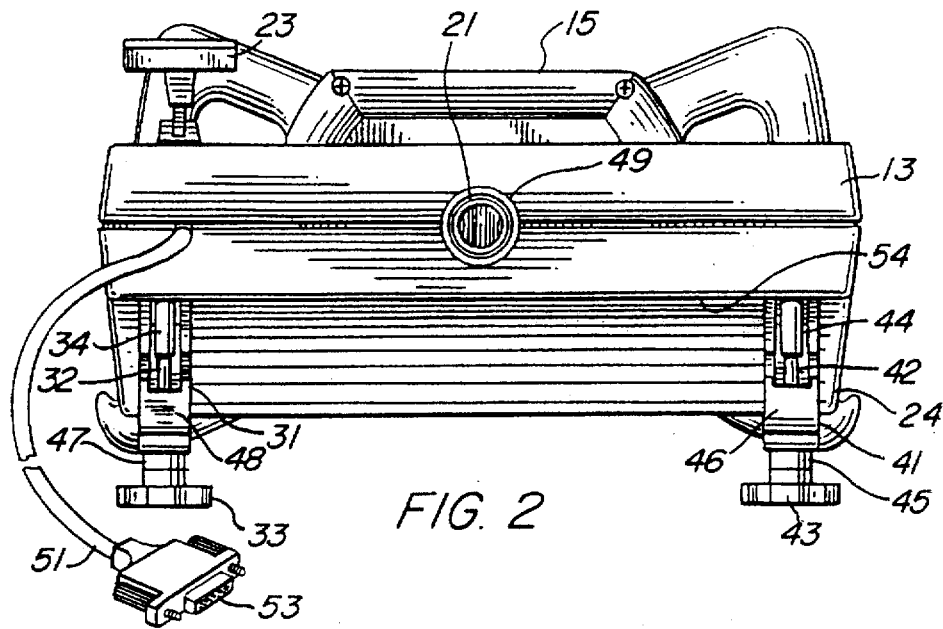
FIG. 2 an end elevation of the present invention.

The control housing 13, which has mechanical and electrical components therein, which will be discussed hereinafter, is connected to a computer such as a personal computer 35 by way of standard cables 51 and connector 53 (FIG. 2). The computer has a video display 37, the video display illustrating scenes 39 as directed by the game software loaded into the computer 35. The scenes 39 may be landscape scenes over which the imagined airplane, controlled by control simulator 11, is flying.

Control housing 13 has controls thereon, such as elevator trim tab 25 and throttle control 23. Control wheel 15 contains an aileron trim tab 36 and a pair of buttons 27, 29 which may be a gun, fire buttons, or used for some similar function, for example.

Figure 3:
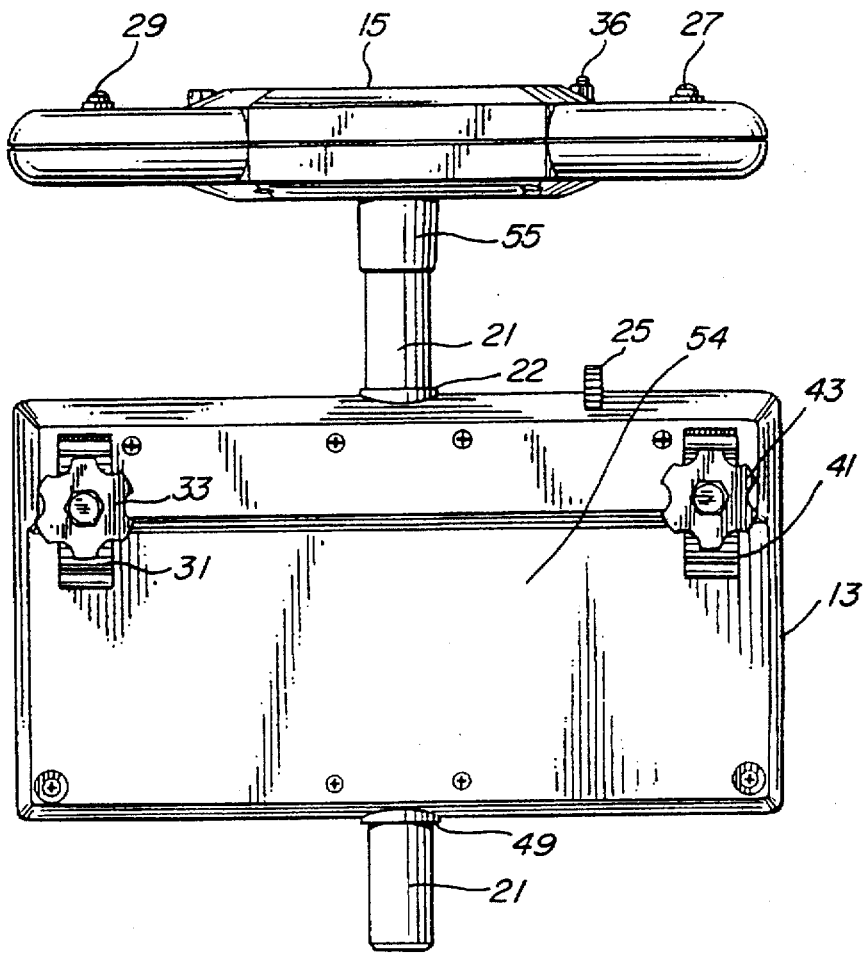
FIG. 3 is a bottom view of the present invention.

As shown in FIGS. 2 and 3, the control wheel shaft 21 extends through the upper part of control housing 13, coming out the back end of housing 13, and sliding within bearings 22 and 49. FIG. 2 illustrates the cable 51 and connector 53 which plugs into computer 35 (FIG. 1).

Control housing 13 is constructed so that its front side 24 (FIG. 1) is wider than its back side 26. When in place for use, the front side 24 hangs over the edge of a mounting surface 12 with the narrower part of control housing 13 resting on support surface 12. The depth of the front part 24 is small so that almost the entire length 54 of the control housing rests on support surface 12.

Located partially within the front section of control housing 13 is a pair of mounting clamps 31, 41 mounted at the respective sides of control housing 13. The desk clamps 31 and 41 are mounted within the larger front end 24 of housing 13 to pivot around their respective inside ends so that the outside ends 46 of clamp 41, and 48 of clamp 31, move up and down with respect to undersurface 54 as the respective mounting knobs 43 and 33 are tightened. Mounting clamp 41 rides on a bushing 45. Mounting clamp 31 rides on a bushing 47. The bushings allow for free rotation of mounting knobs 43 and 33, respectively. Mounting knobs 43 and 33 are fixedly attached to threaded shafts 42 and 32, respectively, which are journalled through portion 44 and 34, respectively, of support structures located within the upper portion of control housing 13 to threadably engage these respective support structures, as will be more clearly described hereinafter.

Figure 4:
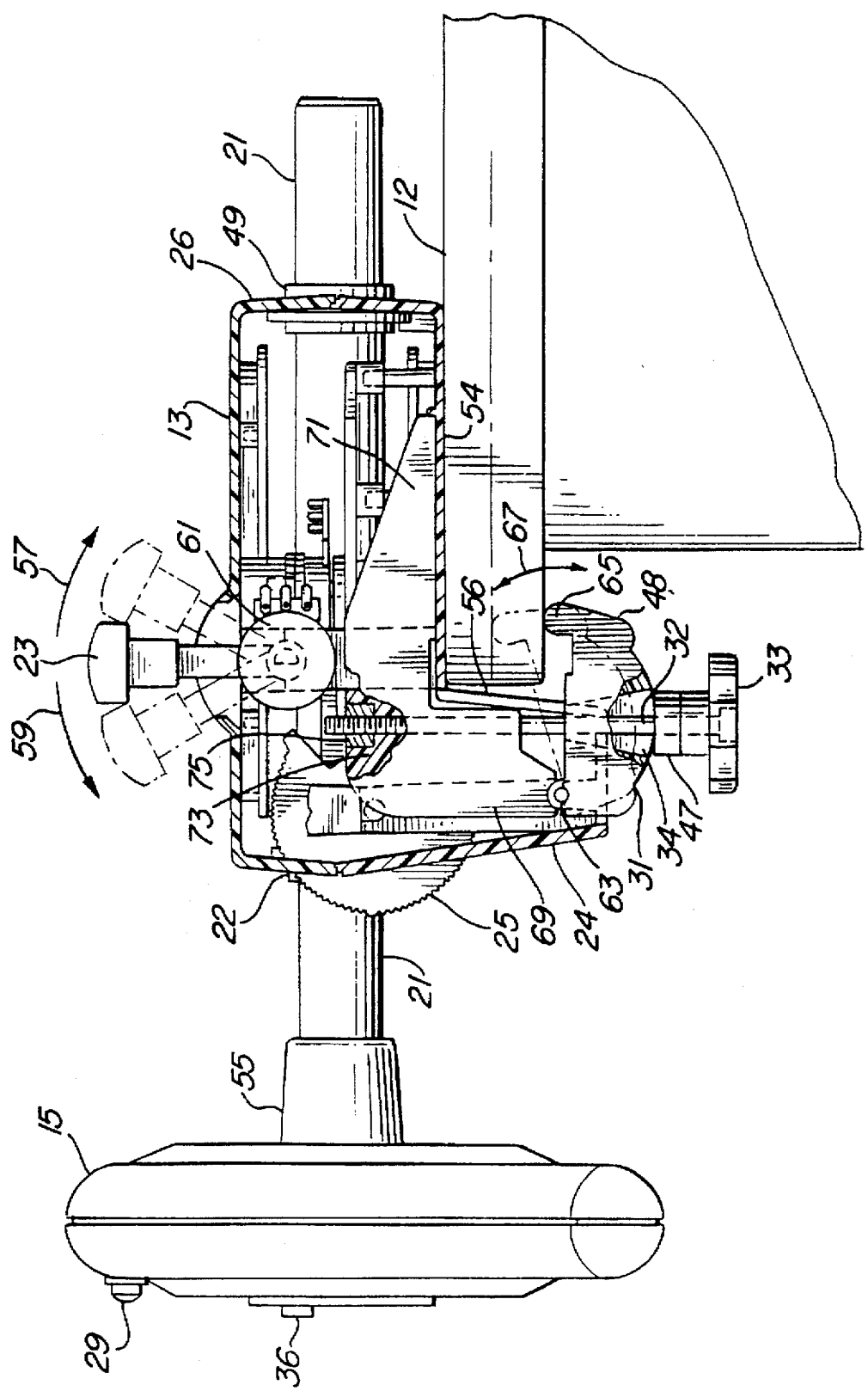
FIG. 4 is a side view cross-section of the control housing for the present invention showing the components therein.

FIG. 4 is a side view cutaway section of the control housing of FIG. 1. The support structure 69 located within the larger front portion 24 of control housing 13 is L-shaped with an elongated section 71 extending towards the back end 26 of control housing 13. The other leg 69 of L-shaped member 73 extends down towards the pivot points 63 of clamp 31. Shaft 32, which is fixedly attached to mounting knob 33, is journalled through this part 69 of support member 73 to threadably engage nut 75, which is fixedly contained within support member 73.

As mounting knob 33 is rotated, causing shaft 32 to be threaded into nut 75, clamp 31 pivots about pivot studs 63, causing its other end 48 to move upward in the direction 67 until the contact round 65 on clamp 31 connects the underside of support surface 12, rigidly holding the entire control housing 13 to surface 12. Support structure 73, through its extended length 71 and its shorter length 69, absorbs the holding forces exerted whereby the support surface 12 is squeezed between support structure 73 and clamp 31 without any adverse effects on the shell of control housing 13. This structure allows support member 73, through its elongated end 71 and its shorter end 69, to absorb all the forces, rather than the skin 54 of control housing 13.

To loosen the holding mechanism, mounting knob 33 is rotating in the opposite direction, causing threaded shaft 32 to back out of nut 75, thereby allowing clamp 31 to pivot around pivot studs 63 in a downward direction 67. Clamp 31 has a truncated prism-shaped aperture 34 there-through, allowing clamp 31 to pivot in direction 67 about shaft 32. This structure accommodates a variety of thicknesses of support surfaces 12 and permits a very secure holding mechanism which is unobtrusively located within and integral to the control housing 13.

The control wheel shaft 21 slides within a pair of bushings, bushing 22, located at the front face 24, and bushing 49, located at the rear face 26 of control housing 13. Control wheel 15, in turn, is mounted for rotation about shaft 21 with a bearing surface 56 (FIG. 3) located on the inside of boss 55, which will be more fully described hereinafter.

A throttle control lever 23 is mounted for rotation with the control shaft of a variable resistor 61. Moving throttle 23, back 59 and forward 57, changes the setting of variable resistor 61, which commensurably changes the simulated speed of flight compatible with the program being used.

Referring now to FIGS. 5 and 6, the elevator control mechanism of the present invention will be explained. Control wheel shaft 21 slides back and forth along direction 19 within bearings 22 and 49. Shaft 21 is prevented from rotating by a boss 83 fixedly attached thereto on its top side and a boss 84 fixedly attached thereto on its bottom side (FIG. 6). Bosses 83 and 84 ride within respective tracks 105 and 101. A pair of pivoting arms 81 and 103 are mounted to variable resistor 95 for pivotal movement with the rotation of the shaft of variable resistor 95.

Each pivoting arm 81 and 101 has an elongated slot therein, such as slot 85 located in pivoting arm 81. Movement of shaft 21 in a direction 19 causes pivoting arms 81 and 103 to pivot back and forth about the symmetrical center of variable resistor 95 with its control shaft. Back-and-forth movement 19 of the control wheel shaft 21 is the elevator control for the simulated airplane in the computer game, causing the airplane to dive or climb in response to shaft 21 being pushed towards the control housing 13 or pulled away from the control housing 13.

The movement of control wheel shaft 21 back and forth in direction 19 causes control arms 81 and 103 to move back and forth in direction 79 against a spring 93, which is connected to a pair of scissor legs 89 and 91. As will be more fully explained hereafter, movement of the control wheel shaft 21 in the direction 19 against spring 93 gives the user a more realistic control feel during play.

The trim tab wheel 25 mounted in control housing 13 is connected to variable resistor 95 by linkage arm 97 and lever arm 99. Elevator trim wheel 25 is simply the zeroing mechanism for variable resistor 95 so that a ground level or start level may be manually adjusted before the start of a game.

Figure 7:
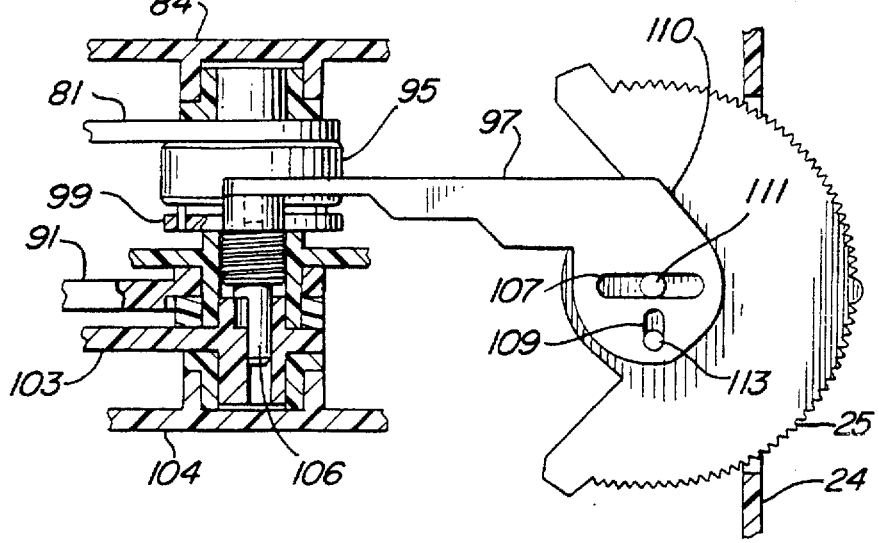
FIG. 7 is a cross-section taken along lines 7—7 of FIG. 5.
Figure 8:
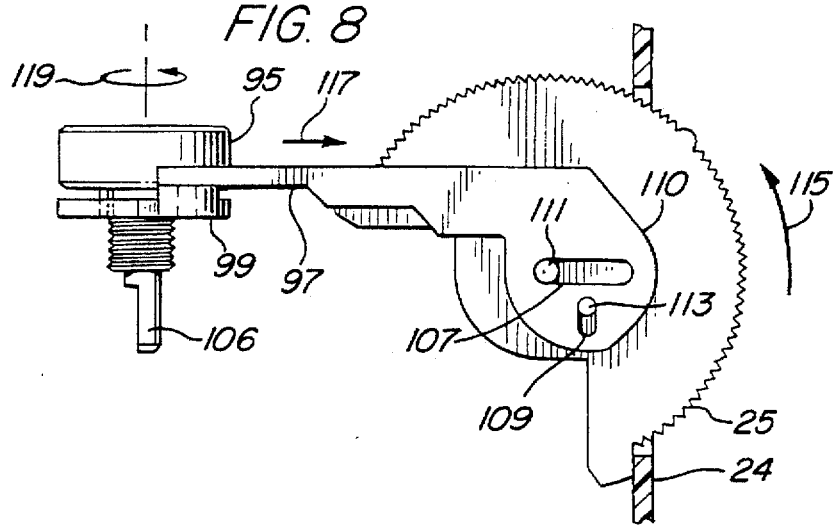
FIG. 8 is a side elevation of just the elevator trim tab of the present invention.
Figure 9:
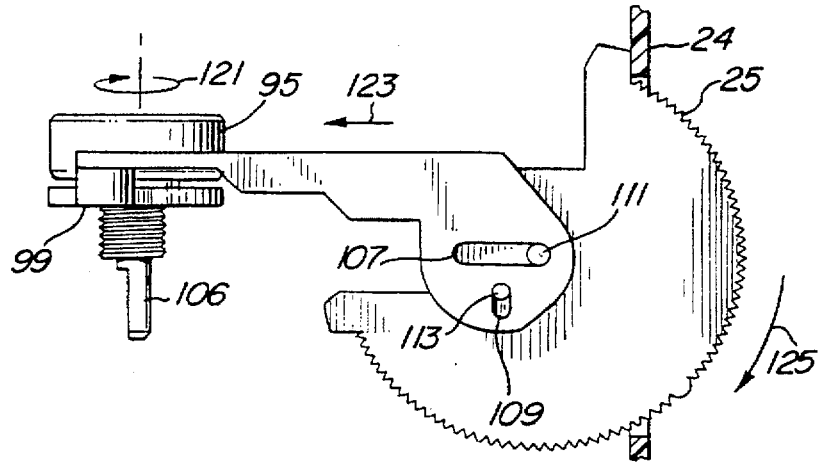
FIG. 9 is a side elevation of just the elevator trim tab of the present invention.

The elevator trim wheel 25 is more fully illustrated in FIGS. 7, 8, and 9. Trim wheel 25 is mounted for rotation about axis 111. This rotational motion is converted into translational movement by linkage arm 97, which connects to pivoting arm 99, which is physically attached to the housing of variable resistor 95. Linkage arm 97 has a large end 110 within which is located a horizontal elongated slot 107 and a shorter, vertical elongated slot 109. The rotational pivot shaft 111 of elevator trim wheel 25 is located within horizontal slot 107. Smaller boss 113 is located within vertical slot 109. Boss 113 is directly beneath pivot shaft 111.

With the linkage arm 97 and the elevator trim wheel 25 in the position indicated in FIG. 7, the variable resistor 95 is positioned with respect to its rotating shaft 106 to be approximately in the center of movement or travel for rotating shaft 106. The entire assembly, including the upper arm linkage 81 and the lower arm linkage 103, the scissor mechanism 91, the variable resistor body 95, and link arm 99, which is connected to the body of resistor 95, are held from movement vertically and horizontally by the top skin 84 and the bottom skin 104 of control housing 13.

Referring now to FIG. 8, movement of the elevator trim wheel 25 in an upward direction 115 causes linkage arm 97 to move away from variable resistor 95 in direction 117, which causes the body of variable resistor 95 to rotate in a counterclockwise direction 119. Rotatable shaft 106 is held stationary by lever arm 103 in a manner which will be more fully explained hereinafter. As can be seen in FIG. 8, the pivot shaft 111 of elevator trim wheel 25 and boss 113 of elevator trim wheel 25 have moved to the extreme left position of slot 107 and the extreme upper position in slot 109, respectively.

Referring now to FIG. 9, if elevator trim wheel 25 is moved in a downward direction 125, linkage arm 97 is moved towards the variable resistor 95 in direction 123, causing linkage 99, which is connected to the body of resistor 95, to rotate in a clockwise direction 121 with respect to the shaft 106 of resistor 95. As can be seen in FIG. 9, the pivot shaft 111 of elevator trim wheel 125 is moved to the extreme right position in slot 107, while boss 113 is moved through a complete cycle in slot 109 from the top to the bottom and back to the extreme top position again.

Once the elevator trim wheel 25 is adjusted for the reference or ground plane position for the particular computer game being utilized, elevator trim wheel 25 is no longer used.

During game play, the shaft 106 of variable resistor 95 is varied to create the elevator control signals, depending upon movement of the control wheel shaft 21 in and out of control housing 113, as can be more clearly seen in FIGS. 10 and 11. The bottom lever arm 103, having a slot 129 at one end thereof, is connected to shaft 21 by boss 84. Boss 84, as will be remembered, is fixedly attached to shaft 21 so that movement of shaft 21 in a direction 127 or 133 will cause boss 84 to move as well. The other end of linkage arm 103 is fixedly attached to the movable shaft 106 of variable resistor 95, the linkage arm 103 essentially pivoting around the rotational center of variable resistor shaft 106.

The scissor mechanism, which is more clearly visible from the bottom in FIGS. 10 and 11, can now be seen to have two arms, 89 and 91, which also rotates about the symmetrical center of shaft 106 of variable resistor 95. In a neutral position (FIG. 5) with the spring not expanded, lever arm 103 is in a position perpendicular to shaft 21. Stub 136, which is physically attached to support plate 87, and stub 131, which is physically attached to the upper surface (far side in FIG. 10 and 11 of linkage arm 103, are located essentially next to each other, along the axis of lever arm 103 when in the neutral position, with both stubs 136 and 131 touching both edges 134 and 132 of scissor arms 89 and 91, respectively.

Because the view of FIG. 10 is from the bottom, movement of shaft 21 in direction 127 is a movement of control wheel 15, attached to control wheel shaft 21, away from control housing 13. Such movement causes boss 84, within slot 129 of linkage arm 103, to move that end of linkage arm 103, causing the other end to pivot shaft 106 of the variable resistor.

This pivoting motion, as a result of stub 131 abutting edge 132 of scissor arm 91, is against spring 93, causing it to expand as illustrated. As a result, if the operator releases the control wheel 15, control wheel shaft 21, due to the forces of expanded spring 93 tending to contract, will bring linkage arm 103 back to its original rest position.

When control wheel 15 is moved in the opposite direction 133, shaft 106 of variable resistor 95 is rotated in the opposite direction as well. This time the movement of linkage arm 103 is against contact surface 134 of scissor arm 89, causing spring 93 to expand as shown in FIG. 11. When the control wheel 15 is released, shaft 21 will move back to its home position due to the force of spring 93 moving linkage arm 103 back to its neutral home position.

Thus, the operator having elevator control of the simulated airplane of the computer game can pull the steering wheel out to cause the airplane to apparently climb and push the steering wheel in to cause the airplane to dive. Simply leaving the steering wheel stationary will cause the airplane to stay at its reference level as set by the elevator trim wheel 25. The result is that a realistic feel is provided to the operator when controlling the airplane to dive and climb.

Figure 14:
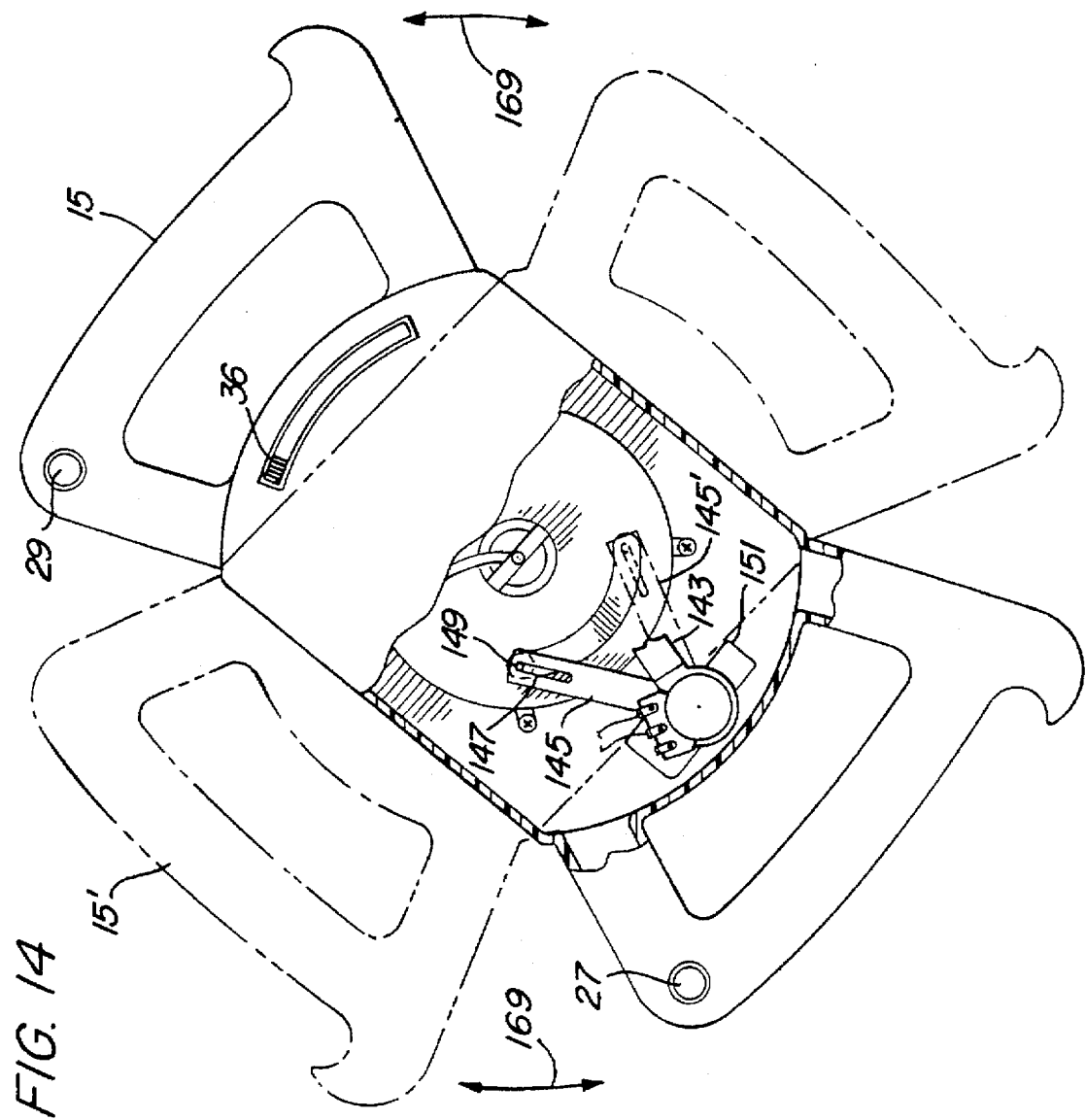
FIG. 14 is a top, partially broken-away view of the top of the control wheel of the present invention.

To control the ailerons of the simulated airplane to cause the airplane to bank left and right, the operator turns control wheel 15 in a counterclockwise or clockwise direction 169, as shown in FIG. 14. This causes the shaft 152 of variable resistor 151 to rotate. As will be more fully explained hereinafter in connection with FIGS. 12 and 13, movement of wheel 15 in direction 169 causes a linkage arm 145 to move the variable shaft of resistor 151 by pivoting about the rotating central axis of that shaft. Linkage arm 145 has a slot 147 located therein within which a stud 149 is located. The stud is attached to a disk 153 (FIG. 12) that is physically attached to the control wheel column 21. It will be remembered that control wheel column 21 does not rotate, but is limited to linear movement in and out of control housing 13. Thus, rotation of control wheel 15 is with respect to a stationary stud 149, which causes the respective movement of linkage arm 145 to 145' and back as illustrated in FIG. 14. Aileron trim lever 36 is located in the face of control wheel 15 and adjusts the neutral position for the aileron controls by way of linkage arm 143 in a manner that will be described hereinafter in connection with FIGS. 12 and 13.

Referring now to FIGS. 12 and 13, the moving electrical parts located within control wheel housing 15 are illustrated. FIG. 12 shows all the parts therein with the cover removed. FIG. 13 is a cross-section taken along lines 13—13 of FIG. 12, showing the interrelationship of the parts in the control wheel housing 15.

Control wheel housing 15 contains within it a potentiometer 151 which provides the signals to the computer for effective aileron control, i.e., left and right turns, for the simulated aircraft. As was already described, a disk 153 mounted under a cover 155 has a stud 149 attached thereto. Lever arm 145, which has an elongated aperture 147 at one end thereof, engages and encompasses stud 149 within the elongated aperture. The other end of linkage arm 145 is connected to rotational shaft 152 (FIG. 13) of potentiometer 151. Thus, movement of rotational arm 145 causes shaft 152 of potentiometer 151 to rotate in a clockwise or counterclockwise direction. Linkage arm 145 is caused to rotate by the user turning the control wheel 15 in a clockwise or counterclockwise direction 169 (FIG. 14).

Linkage arm 135 has, at one end thereof, an upstanding knurled portion 36, and at the other end an elongated aperture 139 that engages an upstanding stud 141 which is physically attached to a second linkage arm 143. Knurled portion 36 is an aileron trim tab which adjusts the neutral or start position for the simulated aircraft so that when the control wheel 15 is in a straight-ahead location as shown in FIG. 12, the signal provided by the variable resistor to the computer so indicates. Lever arm 135 pivots about a stationary stud pivot 137 so that movement of the upstanding knurled portion in a direction 138 to position 135', for example, causes the other slotted end of lever arm 135 to move in the opposite direction, as shown by the dotted lines. Second lever arm 143 is connected to the body of variable resistor 151 (FIG. 13) so that movement of lever 143 rotates the body of resistor 151 with respect to its shaft 152. The shaft of resistor 151 is held stationary by lever arm 145 unless control wheel 15 is rotated, as will be more fully explained hereinafter. Once the aileron trim tab 36 has been adjusted, it is left alone and it is not utilized during the remainder of game play.

Figure 15:
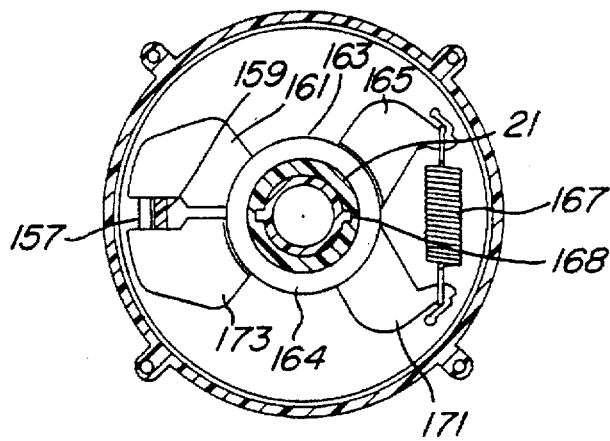
FIG. 15 is a cross-section taken along lines 15—15 of FIG. 13 showing the inner workings of part of the mechanism located in the control wheel.
Figure 16:
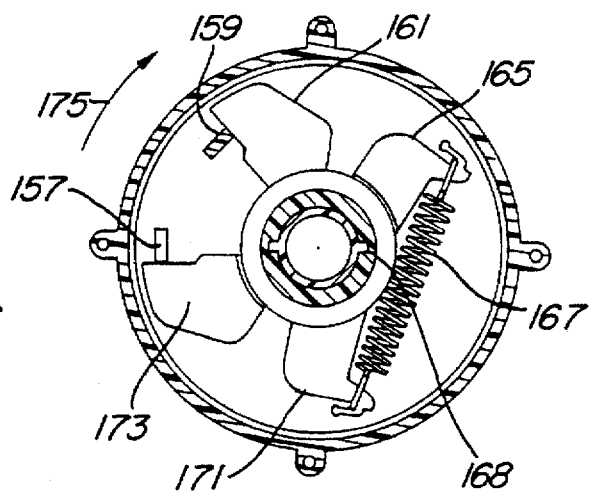
FIG. 16 is a cross-section taken along lines 15—15 of FIG. 13 showing the inner workings of part of the mechanism located in the control wheel when rotated in direction 175 (counter-clockwise in relation to the operator.
Figure 17:
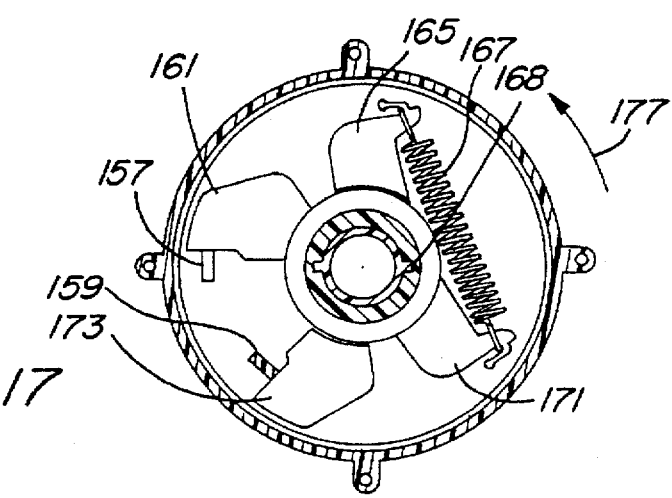
FIG. 17 is a cross-section taken along lines 15—15 of FIG. 13 showing the inner workings of part of the mechanism located in the control wheel when rotated in direction 177 (clockwise in relation to the operator.

Game play proceeds with the operator turning control wheel 15 clockwise or counterclockwise and pushing buttons 27 or 29 to fire weapons or the like. When control wheel 15 is turned clockwise or counterclockwise, it is turned against the force of the spring 167 which is attached to a scissor mechanism having a pair of spring-loaded arms 165, 171 (FIGS. 15, 16, and 17) and a pair of actuated arms 161, 173. Arms 171 and 161 are connected to a sleeve bearing 163, which rotates about control wheel column 21. Arms 165 and 173 are attached to the sleeve bearing 164, which is located below sleeve bearing 163 and also rotates about control wheel column 21. The inside of control wheel column 21 has a pair of key slots 168 therein which receive the key on disk 153 (FIGS. 12 and 13) so that disk 153 is fixedly attached to the end of control column 21 so that disk 153, like control column 21, is prevented from rotating. Disk 153 has attached thereto, on its rear surface, a rectangular stud 157 which extends to the rear and between the pair of control arms 161 and 173 (see also FIG. 13). The back side of the control wheel 15 has fixedly attached thereto a rectangular stud 159, which extends forward between the pair of control arms 161 and 173 of the scissor mechanism. FIG. 15 indicates the position of the two rectangular studs 157 and 159 with respect to the scissor arms 161 and 173 when the control wheel 15 is steering straight ahead.

If the control wheel 15 is turned in a clockwise direction 175 (as needed in FIG. 16), the control wheel 15 turns with respect to and around control shaft 21, causing rectangular stud 159 to move control leg 161 of the scissor mechanism away from control leg 173 against the force of spring 167. If control wheel 15 is released by the operator, the force of spring 167 and its tendency to return to its neutral state will cause control arm 171 to move rectangular stud 159 back to the position of stud 157, thereby rotating the entire wheel back to its home position.

Assuming now that control wheel 15 is rotated in a counterclockwise direction 177 (as viewed in FIG. 17), the rectangular stud 159 now moves control arm 173 away from control arm 161. In each instance when the control wheel 15 is turned, rectangular stud 157, which is located on the fixed disk 153, maintains the other control arm stationary and prevents it from following, thus causing spring 167 to expand as the control wheel 15 is turned against the force of spring 167. Once again, if the control wheel 15 is released, the tendency of spring 167 to return to its unexpanded state will cause the wheel to rotate back so that rectangular studs 159 and 157 are again aligned as shown in FIG. 15.

The result of this mechanism in the steering column is that a realistic feel is provided to the user when controlling the left and right turns of the simulated airplane. The action of the control wheel to return to a straight-ahead position simulates the action of a control wheel that is actually controlling the aileron surfaces of an airplane.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A computer input device for simulating manual controls of a vehicle, the device comprising:
    (a) a housing;
    (b) a control wheel column slidably mounted in the housing, the column being reciprocally slidable along its length within a range of movement;
    (c) means for generating a first signal corresponding to the column's position within its range of movement;
    (d) a control wheel rotatably mounted on an end of the control wheel column external to the housing; the wheel being reciprocally rotatable about the column within a range of movement;
    (e) means for generating a second signal corresponding to the wheel's position within its range of movement; and
    (f) means for communicating the first and second signals to the computer.

2. The device according to claim 1 wherein the control wheel further comprises a housing, and wherein the means for generating the second signal is disposed within the wheel housing.

3. The device according to claim 1 further comprising torque means for opposing rotation of the wheel in either direction from a rest position.

4. The device according to claim 3 wherein the control wheel further comprises a housing, and wherein the torque means is disposed within the wheel housing.

5. The device according to claim 4 wherein the torque means comprises:
    (a) two levers pivotable about the column in a plane normal to the column;
    (b) stop means, in fixed relation to the column and disposed intermediate the levers, for stopping rotation of the levers;
    (c) means for applying torque urging the levers against opposite sides of the stop means, the wheel being in its rest position when the levers are abutting opposite sides of the stop means; and
    (d) drive means, in fixed relation to the wheel, for rotating a lever away from the stop means in response to superior torque applied to the wheel, as by a user, the direction of the applied torque being determinant of which of the two levers is rotated, the rotated lever reacting against the drive means to urge the wheel back to its rest position.

6. The device according to claim 1 further comprising force means for opposing sliding of the column in either direction from a rest position.

7. The device according to claim 1 further comprising means for manually adjusting the first signal to a reference level.

8. The device according to claim 7
    (a) wherein the means for generating the first signal comprises:
        (1) a variable resistance having an axis,
        (2) an arm pivotable about the axis, the magnitude of the resistance depending on the pivot position of the arm, and
        (3) means for converting translational movement of the column to corresponding rotational movement of the arm; and
    (b) wherein the means for adjusting the first signal comprises means for selectively orienting the variable resistance about its axis.

9. The device according to claim 1 further comprising means for manually adjusting the second signal to a reference level.

10. The device according to claim 9
    (a) wherein the means for generating the second signal is disposed in the wheel housing and comprises:
        (1) a variable resistance having an axis,
        (2) an arm pivotable about the axis, the magnitude of the resistance depending on the pivot position of the arm, and (3) means for converting rotational movement of the wheel to corresponding rotational movement of the arm; and (b) wherein the means for adjusting the second signal comprises means for selectively orienting the variable resistance about its axis.

11. The device according to claim 1 further comprising:

(a) wire means for communicating signals from the wheel housing to the housing for subsequent communication to the computer; and (b) a channel defined by the column through which the wire means traverse.

12. The device according to claim 1 further comprising:

(a) a housing skin which defines a bottom face of the housing;

(b) clamping means for securing the housing to a marginal portion of a tabular support, the clamping means comprising:

(1) upper jaw means, disposed within the housing, for abutting the skin of the bottom face and applying force thereto;

(2) lower jaw means, external to the housing, for applying an opposite force to an underside of the marginal portion; and (3) means for closing the jaw means to forcibly grip the marginal portion.

13. The device according to claim 12 further comprising a plurality of laterally spaced clamping means.

14. A computer input device for simulating manual controls of a vehicle, the device comprising:

(a) a housing including a skin defining a bottom face;

(b) a control wheel movably coupled to and supported by the housing, the wheel being reciprocally rotatable about an axis and reciprocally slidable along the axis, within respective ranges, with respect to the housing;

(c) means for generating a signal corresponding to the wheel's axial and rotary positions within its ranges of movement;

(d) means for communicating the signal to the computer; and (e) clamping means for securing the housing to a marginal portion of a tabular support, the clamping means comprising:

(1) upper jaw means, disposed within the housing, for abutting the skin of the bottom face and applying force thereto;

(2) lower jaw means, external to the housing, for applying an opposite force to an underside of the marginal portion; and (3) means for closing the jaw means to forcibly grip the marginal portion.

15. The device according to claim 14 further comprising a plurality of laterally spaced clamping means.

16. The device according to claim 15 wherein each upper jaw means includes a shank portion extending below the bottom face, and wherein the respective lower jaw means is pivotally connected to the shank portion to accommodate marginal portions within a range of thicknesses.

17. The device according to claim 16 wherein each means for closing extends through an aperture defined by a respective lower jaw means and is threadably journalled in a respective upper jaw means.

18. The device according to claim 17 wherein the means for closing is a threaded shaft, and wherein the aperture is dove-tailed to accommodate a range of pivoting by the lower jaw means with respect to the upper jaw means.

19. The device according to claim 14 wherein the clamping means comprises a clam-shell structure including two clamping surfaces, the upper jaw means being one clamping surface and the lower jaw means being the other clamping surface.

20. A computer input device for simulating manual controls of a vehicle, the device comprising:

(a) a housing;

(b) a control wheel column slidably mounted in the housing, the column being reciprocally slidable along its length within a range of movement;

(c) means for generating a signal corresponding to the column's position within its range of movement;

(d) means for communicating the signal to the computer; and (e) means for opposing sliding of the control wheel column in either direction from a rest position, said means comprising:

(1) two levers pivotable about an axis normal to the column, the axis being in fixed relation to the housing;

(2) stop means, in fixed relation to the housing and disposed intermediate the levers, for stopping rotation of the levers;

(3) means for applying torque urging the levers against opposite sides of the stop means, the column being in its rest position when the levers are abutting opposite sides of the stop means;

(4) drive means for rotating a lever of the two levers away from the stop means in response to superior torque applied to the drive means, the direction of the applied torque being determinant of which of the two levers is rotated; and (5) conversion means, to which the drive means is affixed, for converting translational force applied to the column, as by a user, to torque applied to the drive means, and for converting reactive torque applied by the rotated lever against the drive means to reactive translational force applied to the column, the reactive translational force urging the column back to its rest position.

* * * * *

UNITED STATES PATENT AND TRADEMARK OFFICE
CERTIFICATE OF CORRECTION

PATENT NO. : 5,727,188
DATED : March 10, 1998
INVENTOR(S) : Charles L. Hayes

Page 1 of 2

It is certified that error appears in the above-indentified patent and that said Letters Patent is hereby corrected as shown below:

In column 1, line 57, the word --is-- was omitted and should be added immediately after the number "2".

In column 2, line 19, the character --)-- was omitted and should be added immediately after the word "operator".

In column 2, line 24, the character --)-- was omitted and should be added immediately after the word "operator".

In column 5, line 34, the word "rotates" should be replaced with the word --rotate--.

In column 5, line 39, the character --)-- was omitted and should be added immediately after the number "11".

UNITED STATES PATENT AND TRADEMARK OFFICE
CERTIFICATE OF CORRECTION

PATENT NO. : 5,727,188
DATED : March 10, 1998
INVENTOR(S) : Charles L. Hayes

It is certified that error appears in the above-indentified patent and that said Letters Patent is hereby corrected as shown below:

In column 6, line 49, the number "139" should be replaced with the number --189--.

In column 7, line 26, the word "needed" should be replaced with the word --viewed--.

In figure 12, the number "136" designating the direction of travel of the trim tab 36 should be changed to --138--.

Signed and Sealed this

Eighth Day of September, 1998

*Attest:*

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,727,188
DATED : March 10, 1998
INVENTOR(S) : Charles L. Hayes

It is certified that error appears in the above-identified patent and that said Letters Patent is hereby corrected as shown below:

In column 4, line 16, the number "101" should be replaced with the number --103--.

In column 6, line 49, the number "139" should be replaced with the number --189--.

In figure 12, the number "136" designating the direction of travel of the trim tab 36 should be changed to --138--.

Signed and Sealed this

Twenty-seventh Day of October, 1998

Attest:

BRUCE LEHMAN

*Attesting Officer*     *Commissioner of Patents and Trademarks*